United States Patent [19]

Stenzenberger

[11] 4,211,860

[45] Jul. 8, 1980

[54] THERMOSETTING IMIDE RESINS FROM DIHYDRAZIDE OF DICARBOXYLIC ACID

[75] Inventor: Horst Stenzenberger, Schriesheim, Fed. Rep. of Germany

[73] Assignee: Technochemie GmbH Verfahrenstechnik, Dossenheim, Fed. Rep. of Germany

[21] Appl. No.: 964,665

[22] Filed: Nov. 29, 1978

[30] Foreign Application Priority Data

Dec. 2, 1977 [DE] Fed. Rep. of Germany ....... 2754631

[51] Int. Cl.$^2$ ............................................. C08G 73/12
[52] U.S. Cl. .................................. 528/312; 260/30.2; 260/32.6 NA; 260/37 N; 428/474; 528/170; 528/210; 528/211; 528/321; 528/322
[58] Field of Search ............... 528/322, 170, 210, 211, 528/315, 312

[56] References Cited

U.S. PATENT DOCUMENTS 3,669,930   6/1972   Asahara et al. ...................... 528/322

Primary Examiner—Harold D. Anderson
Attorney, Agent, or Firm—Schwartz, Jeffery, Schwaab, Mack, Blumenthal & Koch

[57] ABSTRACT

Novel imide resins are prepared by reacting a bisimide of an unsaturated dicarboxylic acid with a dihydrazide of a dicarboxylic acid, preferably in an organic solvent or diluent at elevated temperature for a period of time insufficient to yield an insoluble, infusible, fully cured imide resin. Solutions of the resulting prepolymerization product are stable at room temperature and their viscosity remains substantially unchanged for a prolonged period of time. Fully cured imide resins and articles thereof of a high heat resistance are obtained by heating said prepolymerized imide resin or materials such as fibers, metal wire webs, and others impregnated therewith, if desired, in the presence of curing catalysts, inhibitors, fillers, and other materials, to curing temperature up to 350° C.

17 Claims, No Drawings

THERMOSETTING IMIDE RESINS FROM DIHYDRAZIDE OF DICARBOXYLIC ACID

BACKGROUND OF THE INVENTION (1) Field of the Invention

The present invention relates to novel and highly advantageous thermosetting imide resins, to a process of producing such imide resins, to compositions and methods of using same, and to articles made therewith.

(2) State of the Prior Art

It is known that the ethylenic double bond of maleic acid imides is readily reacted with basic organic compounds and especially with organic amines whereby aspartic acid imides are formed. This mode of reaction has been used, for instance, for producing polymerizable imide resins. U.S. Pat. No. 3,562,223 describes said reaction and the reaction products. According to said patent the speed of reaction is determined to a far reaching extent by the basicity of the amino compound.

SUMMARY OF THE INVENTION

It is one object of the present invention to provide novel and highly advantageous thermosetting imide resins.

Another object of the present invention is to provide a simple and effective process of producing such thermosetting imide resins.

Still another object of the present invention is to provide a simple and effective method of polymerizing and hardening of the prepolymerization products obtained according to the present invention.

A further object of the present invention is to provide articles such as molded articles or coated fiber materials, webs, filaments, rovings, and the like.

Other objects of the present invention and advantageous features thereof will become apparent as the description proceeds.

In principle the novel thermosetting imide resins according to the present invention are obtained by reacting an N,N-bisimide of an unsaturated dicarboxylic acid of the following Formula I:

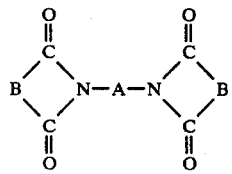

(I)

in which

B is a divalent group which contains a carbon to carbon double bond, while

A is a divalent group with at least two carbon atoms, with the dihydrazide of a dicarboxylic acid of the following Formula II:

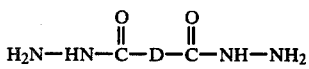

(II)

in which D is a divalent group.

The group designated by A in Formula I can be
an alkylene group with 2 to 12 carbon atoms,
a cycloalkylene group with 5 or 6 carbon atoms,
a heterocyclic group with 4 or 5 carbon atoms and at least one nitrogen, oxygen, or sulfur atom in the heterocyclic ring,
a mono- or dicarbocyclic group, or
at least two mono- or dicarbocyclic aromatic or cycloalkylene groups which may be linked to each other by
a carbon to carbon bond or by a divalent group such as oxygen,
sulfur,
alkylene with 1 to 3 carbon atoms, or one of the following groups:

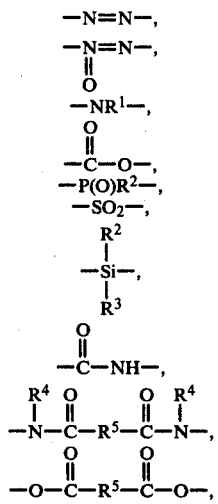

In said groups the substituents $R_1$, $R_2$, $R_3$, $R_4$, and $R_5$ are alkyl with 1 to 5 carbon atoms.

The group B in Formula I is a divalent organic group which contains an ethylenic double bond.

Group B may be one group of the following structural formulas:

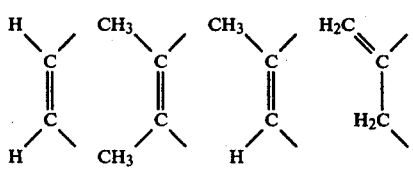

Bisimides which have proved to be of special value for preparing the novel imide resins are:
1,2-Bismaleimido ethane,
1,4-bismaleimido butane
1,6-bismaleimido hexane,
1,12-bismaleimido dodecane,
1,6-bismaleimido-(2,2,4-trimethyl) hexane,
1,3-bismaleimido benzene,
1,4-bismaleimido benzene,
4,4'-bismaleimido diphenyl methane,
4,4'-bismaleimido diphenyl ether,
4,4'-bismaleimido diphenyl sulfide,
4,4'-bismaleimido diphenyl sulfone,
4,4'-bismaleimido dicyclohexyl methane,
2,4-bismaleimido toluene,
2,6-bismaleimido toluene,
N,N'-m-xylylene bismaleimide,
N,N'-p-xylylene bismaleimide,
N,N'-m-phenylene biscitraconimide,
N,N'-4,4'-diphenylmethane bisitaconimide, and others. Mixtures of the above mentioned bisimides can also be used for producing the imide resins according to the present invention.

Suitable dicarboxylic acids dihydrazides are, for instance, the following compounds:
Oxalic acid dihydrazide,
malonic acid dihydrazide,
succinic acid dihydrazide,
glutaric acid dihydrazide,
adipic acid dihydrazide,
pimelic acid dihydrazide,
suberic acid dihydrazide,
sebacic acid dihydrazide,
cyclohexane dicarboxylic acid dihydrazide,
terephthalic acid dihydrazide,
isophthalic acid dihydrazide,
2,6-naphthalene dicarboxylic acid dihydrazide,
2,7-naphthalene dicarboxylic acid dihydrazide,
and others. Mixtures of two or more of the above mentioned dicarboxylic acid dihydrazides can also be used.

The reaction of the bisimides with the dicarboxylic acid dihydrazides to yield the imide resins according to the present invention is carried out in such a manner that the molar proportion of bisimide and dihydrazide $$\frac{\text{number of moles of N,N'-bisimide of Formula I}}{\text{number of moles of dicarboxylic acid dihydrazide of Formula II}}$$

is between about 1.1 and 10.0.

In principle the present invention comprises the observation that the hydrazides of organic acids are also added to the double bond of unsaturated dicarboxylic acid imides, such as maleic acid imides and that the speed of said reaction is quite high although the basicity of the hydrazide group is lower than that of the amino group. Due to this heretofore unknown reaction it has been possible to produce polymerizable imide resins by reacting unsaturated carboxylic acid bisimides with dihydrazides of organic dicarboxylic acids preferably in such a manner that, as stated above, an excess of bisimide is employed, i.e. that the molar proportion of the two reactants is between about 1.1 and about 10.0.

The new imide resins can be prepared in an inert polar organic solvent or diluent, for instance, in dimethyl formamide, dimethyl acetamide, N-methyl pyrrolidone, tetramethyl urea, and the like. Solvents of a low boiling point such as dioxane and tetrahydrofurane can also be used for producing the prepolymerization products of the present invention. Formation of the prepolymerization products preferably takes place in the above mentioned diluents if further processing of the reaction product requires the use of a solution. The imide resins can also be produced by intimately mixing the starting materials, thereby proceeding according to conventional measures for mixing and grinding of powder, and by heating thereupon the mixture for a predetermined period of time to a temperature between 70° C. and 180° C. Heating in this manner is continued until a still moldable and, if desired, even soluble imide resin is produced.

The novel imide resins can also be prepared in an inert diluting agent in which one or both of the two starting materials are insoluble. This mode of procedure is preferably employed when prepolymerization is not to be carried too far.

When using the new imide resins for many technical purposes, they are advantageously hardened and cured with the addition of polymerization accelerating catalysts. Effective curing catalysts are, for instance, organic peroxides such as di-tertiary butyl peroxide, dicumyl peroxide, tertiary butyl perbenzoate, and others in concentrations of 0.1% to 0.5%, calculated for the total weight of the hardenable imide resin. If catalysts are employed, they are preferably admixed to the starting materials for producing the prepolymerization products according to one of the above described techniques.

The new imide resins are advantageously employed for other technical applications in such a manner that the curing process which proceeds via a vinyl polymerization, is delayed. In these instances the production of the imide resins is carried out in the presence of polymerization inhibitors, for instance, of hydroquinone. The amount of inhibitors added is between about 0.1% and about 1.0%.

Complete hardening or curing of the imide resin is effected by heating the same to temperatures between about 100° C. and about 350° C., if desired, under pressure. The preferred reaction temperature is between 160° C. and 260° C. When proceeding in this manner, insoluble, infusible, cross-linked resins with excellent stability at high temperaturs are obtained. A preferred field of application of the new imide resins is in the manufacture of molded laminates. To produce such molded laminates, the imide resins are dissolved in high boiling solvents such as N-methyl pyrrolidone, dimethylacetamide or dimethylformamide. Glass fibers in the form of rovings or webs, carbon fibers, boron fibers, or synthetic organic fibers in the form of webs, filaments, or rovings are coated or impregnated with the resulting solution. Thereupon the solvent is removed by evaporation and layers of the impregnated fiber materials are then pressed by means of pressure and high temperature to the desired molded laminate.

The imide resins according to the present invention have noteworthy advantages over the resins obtained according to the above mentioned U.S. Pat. No. 3,562,223. Thus the solution of the new resins in the above mentioned solvents is stable at room temperature for an almost unlimited period of time without any increase of the viscosity of the resin solution. This means that impregnated fiber materials, so called pre-impregnated materials, which may contain up to 10% of residual solvent, are stable and can be stored practically for any period of time without changing the flowability characteristics of the resins which are essential for further processing.

The imide resins can also be processed according to methods known as powder press technique for hardenable materials as they are known per se to produce molded bodies. In this case the final hardening or curing takes place under pressure whereby at the same time molding is effected. Additives such as fillers, pigments, plasticizers, and flame-proofing agents can be added to the imide resins for specific uses. Especially suitable fillers are, for instance, glass fibers, carbon fibers, organic high modulus fibers such as aramides, quartz powder, kaolin, silicon dioxide, or metals in the form of fine powders.

DESCRIPTION OF THE PREFERRED EMBODIMENTS

The following examples serve to illustrate the present invention without, however, limiting the same thereto.

EXAMPLE 1

35.84 g. (0.1 mole) of 4,4'-bis-maleimido diphenyl methane and 5.83 g. (0.03 moles) of isophthalic acid dihydrazides are mixed thoroughly and the mixture is molten in a round bottom flask at 155° C. Heating is continued for 10 more minutes. The resulting melt is degasified by application of a partial vacuum. The prepolymerization product obtained in this manner can further be processed as follows:

(a) The melt is poured into a casting mold (100 mm.×100 mm.×3 mm) which was preheated to 160° C., and is therein finally hardened by increasing the temperature step by step to 200° C. within three hours and continuing heating at 200° C. for three more hours.

(b) The molten prepolymerization product is cooled to room temperature and is dissolved in N-methyl pyrrolidone, while stirring, to yield a 50% solution. The viscocity of said solution remains stable even on standing for a prolonged period of time. The solution is suitable for the production of preimpregnated glass fiber webs in the following manner. Glass fiber webs of the type G 92111/A 1100 of the firm Interglas of Ulm, West Germany, are immersed into the solution of the prepolymerization product and are thus homogeneously coated with the resin solution. The impregnated glassfiber web is then dried at 140° C. in a dryer by means of circulating air within 10 minutes. Several pre-impregnated glass fiber webs are placed one upon the other into a platen press and the laminate is hardened under pressure at a temperature of 200° C. A glass fiber web laminate in which the hardened resin is the binding agent is obtained in this manner.

(c) After cooling the melt to room temperature the resulting prepolymerization product is ground with graphite powder in a ball mill to a homogeneous mixture. The mixture is used advantageously as a molding composition. Molded articles can be obtained therefrom by pressing the molding composition under pressure at a temperature of about 200° C. by means of a ram press.

EXAMPLE 2

35.84 g. (0.1 mole) of 4,4'-bismaleimido diphenyl methane and 5.83 g. (0.03 moles) of terephthalic acid hydrazide are dissolved in 41.7 g. of dimethyl acetamide while stirring vigorously and increasing the temperature to 80° C. In order to produce the prepolymerization product, stirring of the mixture is continued at 80° C. for thirty more minutes. The prepolymerization product is recovered by slowly stirring the solution into 400 cc. of water. The prepolymerization product is isolated by filtration, thoroughly washed with water, and dried.

EXAMPLE 3

A mixture of 56 g. of 4,4'-bismaleimido diphenyl methane, 24 g. of 2,4-bismaleimido toluene, and 24 g. of 2,2,4-trimethyl hexamethylene bismaleimido are intimately mixed with 10.45 g. of adipic acid dihydrazide in a round bottom flask. The mixture is molten at 125° C. while rotating the round bottom flask. Heating is continued for 15 minutes in order to yield the prepolymerization product. After degassifying the reaction by subjecting it to a partial vacuum, the prepolymerization product can be further processed as described in example 1.

EXAMPLE 4

232 g. (0.647 moles) of 4,4'-bismaleimido diphenyl ether, 92.58 g. (0.353 mole) of 2,4-bismaleimido toluene, and 26.40 g. (0.2 mole) of malonic acid dihydrazide are thoroughly mixed with each other in a ball mill. The mixture is then heated in a rotating round bottom flask placed in an oil bath, to a temperature of 148° C. until a homogeneous melt is obtained. Said melt is degassified by subjecting it to a partial vacuum of 20–30 Torr. In order to use this melt as a molding composition, it is furthermore heated at 148° C. for 45 minutes. A very highly viscous melt (viscosity of 3000–5000 cP) is obtained. This melt, after cooling to room temperature, is ground to a powder. The polyimide prepolymerization product can be mixed with pulverulent and fibrous fillers such as quartz powder, graphite, molybdenum sulfide, glass fibers, carbon fibers, and the thus resulting mixture is pressed and molded at 200° C. to yield molded articles.

EXAMPLE 5

360.4 g. (1.0 mole) of 1,12-bismaleimido dodecane of the melting point 112° C. are stirred with 69.7 g. (0.4 moles) of adipic acid dihydrazide of the melting point 171° C. at 140° C. to yield a homogeneous, clear melt. This melt is kept at said temperature of 140° C. for half an hour in order to produce the prepolymerization product. After cooling, the polyimide prepolymerization product can be dissolved in tetrahydrofurane, dioxane, or methyl ethyl ketone to a highly concentrated adhesive resin solution.

EXAMPLE 6

In order to produce glass fiber webs pre-impregnated with the prepolymerization product and to process said webs to laminated webs, the prepolymerization product is preferably produced in solution and is not isolated therefrom. For this purpose 107.51 g. (0.3 moles) of 4,4'-bismaleimido diphenyl methane and 17.46 g. (0.09 moles) of terephthalic acid dihydrazide are dissolved in 124.97 g. of dimethyl acetamide by heating to 120° C. while stirring. A clear solution of the prepolymerization product is obtained after 15 minutes. The viscosity of the solution at room temperature amounts to 62 cP. Since it is of advantage to employ more highly viscous impregnating solutions for many purposes, the solution is heated to 120° C. for 3½ hours. In this manner the prepolymerization is further advanced and a solution is obtained which has a kinematic viscosity of 240 centistokes.

EXAMPLE 7

500 g. of a mixture of 1 mole of 4,4'-bismaleimido diphenyl ether and 0.3 moles of isophthalic acid dihydrazide are stirred portion by portion into 500 cc. of dimethyl acetamide. The mixture is heated at 70° C. to 75° C. yielding thereby a clear solution. After stirring the solution for 30 minutes, it is added, while still cold, into 7 liters of water, thereby stirring vigorously. The precipitated reaction product is filtered off by suction, thoroughly washed with water, and dried in a vacuum chamber at 60°–70° C. The yield is quantitative. The resulting fine yellow powder melts within a range of 130° C. to 140° C. A 50% solution of said prepolymerization product in N-methyl pyrrolidone has a viscosity of 280 centistokes. Its viscosity remains substantially unchanged for more than eight weeks.

Other bisimides and hydrazides as listed in the following examples can be used as reactants for producing imide resins according to the present invention, whereby the procedure is the same as described hereinabove.

| Ex. | Bisimide | Dicarboxylic acid dihydrazide |
|---|---|---|
| 8 | Bismaleimido ethane | Oxalic acid dihydrazide |
| 9 | Bismaleimido hexane | Succinic acid dihydrazide |
| 10 | Bismaleimido benzene | Glutaric acid dihydrazide |
| 11 | 4,4'-Bismaleimido diphenyl sulfide | Pimelic acid dihydrazide |
| 12 | 4,4'-Bismaleimido diphenyl sulfone | Suberic acid dihydrazide |
| 13 | 4,4'-Bismaleimido dicyclohexyl methane | Sebacic acid dihydrazide |
| 14 | 2,6-Bismaleimido toluene | Cyclohexane dicarboxylic acid dihydrazide |
| 15 | N,N'-m-Xylylene bismaleimide | 2,6-Naphthalene dicarboxylic acid dihydrazide |
| 16 | N,N'-p-Xylylene bismaleimide | 2,7-Naphthalene dicarboxylic acid dihydrazide |
| 17 | N,N'-n-Phenylene biscitraconimide | Malonic acid dihydrazide |
| 18 | N,N'-4,4'-Diphenyl methane biscitraconimide | Adipic acid dihydrazide |
| 19 | N,N'-4,4'-Diphenyl methane bisitaconimide | Terephthalic acid dihydrazide |

As stated above, there can also be used as the hydrazide reactant heterocyclic dicarboxylic dihydrazides such as 2,6-pyridine dicarboxylic acid dihydrazide 3,4-pyrrole dicarboxylic acid dihydrazide, 3,4-thiophene dicarboxylic acid dihydrazide, 2,5-furane dicarboxylic acid dihydrazide, and the like compounds.

Although the molar proportion of the bisimide to the dicarboxylic acid dihydrazide is preferably between 1.1 and 10.0, it may also be between 1.1 and 100.0, i.e. that there is always present an excess of the bisimide.

Suitable peroxide accelerators, in addition to those mentioned hereinabove, are, for instance, dilauryl peroxide, tertiary butyl cumyl peroxide, and the like peroxides, or azo bis-isobutyronitrile, and the like compounds.

The group designated by A in Formula I as given hereinabove may also correspond, in addition to the groups listed previously, to the following formulas:

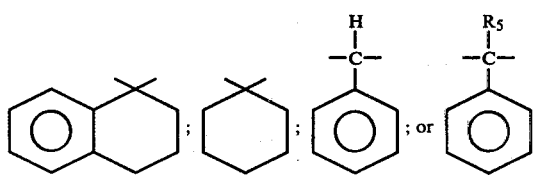

the substituent $R_5$ being alkyl with one to six carbon atoms, cycloalkyl with five to six carbon atoms, or mono- or dicarbocyclic aryl.

The group designated by B in Formula I as given hereinabove, i.e. a group which is capable of addition polymerization, may correspond, in addition to the groups listed previously, to one of the following groups

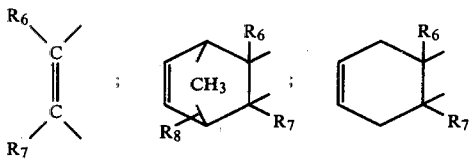

in which $R_6$, $R_7$, and $R_8$ are hydrogen or alkyl with 1 to 6 carbon atoms.

Compounds of this type which can also be used as the bisimide reactant, are, for instance, bis-tetrahydrophthalimide; bis-endomethylene phthalimide; N,N'-4,4'-bismaleimido azobenzene; N,N'-4,4'-bismaleimido diphenyl silane; N,N'-4,4'-bismaleimido diphenyl phosphine oxide; N,N'-1,5-bismaleimidonaphthalene; N,N'-2,6-bismaleimido pyridine; N,N'-2,5-bismaleimido furane; N,N'-2,5-bismaleimido pyrrole, and the like compounds.

Of course, many changes and variations in the preparation of the prepolymerization products, in the reaction temperature, duration, pressure employed, and other reaction conditions, in the solvents and polymerization catalysts, inhibitors, or accelerators used, in the additives such as fillers, pigments, plasticizers, flame proofing agents, and the like may be made by those skilled in this art in accordance with the principles set forth herein and in the claims annexed hereto.

I claim:

1. A thermosetting imide resin consisting of the reaction product of at least one N,N'-bisimide of an unsaturated dicarboxylic acid of the formula

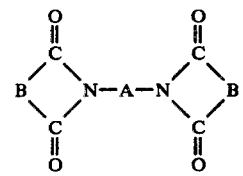

in which
A is a divalent organic group with at least two carbon atoms; and
B is a divalent group having a carbon to carbon double bond and being capable of addition polymerization
with at least one dihydrazide of a dicarboxylic acid of the formula

in which D is a divalent organic group,
the molar proportion of the bisimide and the dihydrazide as expressed by the following equation $$\frac{\text{number of moles of N,N-bisimide}}{\text{number of moles of dicarboxylic acid dihydrazide}}$$

being between 1.1 and 10.0.

2. The imide resin of claim 1, in which the bisimide is a bisimide selected from the group consisting of
1,2-bismaleimido ethane,
1,6-bismaleimido hexane,
1,12-bismaleimido dodecane,
1,6-bismaleimido-(2,2,4-trimethyl) hexane, 1,3-bismaleimido benzene,
1,4-bismaleimido benzene,
4,4′-bismaleimido diphenyl methane,
4,4′-bismaleimido diphenyl ether,
4,4′-bismaleimido diphenyl sulfide,
4,4′-bismaleimido diphenyl sulfone,
4,4′-bismaleimido dicyclohexyl methane,
2,4-bismaleimido toluene,
2,6-bismaleimido toluene,
N,N′-m-xylylene bismaleimide,
N,N′-p-xylylene bismaleimide,
N,N′-m-phenylene biscitracon imide,
N,N′-4,4′-diphenyl methane biscitraconimide, and
N,N′-4,4′-diphenyl bisitaconimide.

3. The imide resin of claim 1, in which the dicarboxylic acid dihydrazide is a dihydrazide selected from the group consisting of
oxalic acid dihydrazide,
malonic acid dihydrazide,
succinic acid dihydrazide,
glutaric acid dihydrazide,
adipic acid dihydrazide,
pimelic acid dihydrazide,
suberic acid dihydrazide,
sebacic acid dihydrazide,
cyclohexane dicarboxylic acid dihydrazide,
terephthalic acid dihydrazide,
isophthalic acid dihydrazide,
2,6-naphthalene dicarboxylic acid dihydrazide,
2,7-naphthalene dicarboxylic acid dihydrazide, and mixtures of said dihydrazides.

4. The imide resin of claim 1, said resin being prepared by using a mixture of bisimides as the bisimide reactant.

5. The imide resin of claim 1, said resin being prepared by using a mixture of bisimides and dihydrazides as the reactants.

6. The imide resin of claim 1, said resin being prepared by reacting 4,4′-bismaleimido diphenyl methane and terephthalic acid dihydrazide in the molar proportion between 1.1 and 10.0.

7. The imide resin of claim 1 containing an organic peroxide as curing catalyst.

8. The imide resin of claim 1 containing a curing inhibitor.

9. In a process of producing a thermosetting imide resin, the step which comprises heating an N,N′-bisimide of an unsaturated dicarboxylic acid of the formula

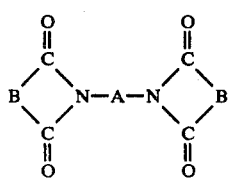

in which
A is a divalent organic group with at least two carbon atoms; and
B is a divalent group having a carbon to carbon double bond and being capable of addition polymerization
with a dihydrazide of a dicarboxylic acid of the formula

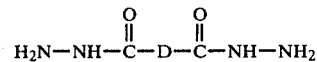

in which D is a divalent organic group
in a molar proportion between about 1.1 and about 10.0 in an organic diluent to a temperature not substantially exceeding about 180° C. for a period of time to yield a moldable and curable, thermosetting prepolymerized imide resin.

10. The process of claim 9, in which the diluent is an inert, polar organic solvent.

11. The process of claim 10, in which the inert, polar organic solvent is a solvent selected from the group consisting of dimethyl formamide, dimethyl acetamide, N-methyl pyrrolidone, and tetramethyl urea.

12. In a process of producing a thermosetting imide resin, the steps which comprises intimately mixing a finely divided N,N′-bisimide of an unsaturated dicarboxylic acid of the formula

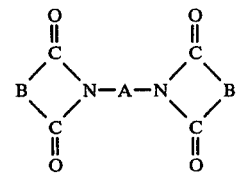

in which
A is a divalent organic group with at least two carbon atoms; and
B is a divalent group having a carbon to carbon double bond and being capable of addition polymerization
with a dihydrazide of a dicarboxylic acid of the formula

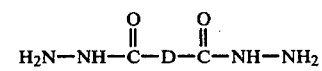

in which D is a divalent organic group
in a molar proportion between about 1.1 and about 10.0 and heating the resulting mixture to a temperature between about 70° C. and about 180° C. for a period of time to yield a moldable and curable, thermosetting prepolymerized imide resin.

13. The process of claim 9, comprising the additional step of hardening and curing the prepolymerized imide resin by further heating the same to a temperature between about 100° C. and about 350° C. to yield a substantially insoluble, infusible, cross-linked polymerized imide resin of high thermal stability.

14. The process of claim 13, in which the additional step is carried out with the addition of a curing accelerating catalyst.

15. The process of claim 9, in which the step of producing the prepolymerized imide resin is carried out with the addition of a curing inhibiting agent.

16. The solution of a moldable and curable, thermosetting, prepolymerized imide resin of claim 1 in an inert, polar, organic solvent, said solution being stable on storage for a prolonged period of time without its viscosity substantially increasing during said storage.

17. The thermosetting imide resin of claim 1, in which the divalent group B of the N,N′-bisimide of an unsaturated dicarboxylic acid of the formula given in claim 1
corresponds to one of the groups
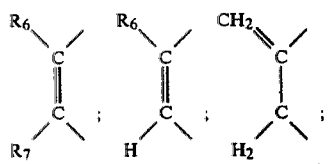
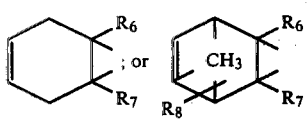
$R_6$, $R_7$, and $R_8$ in said formulas being hydrogen or alkyl with one to six carbon atoms.
* * * * *